United States Patent [19]

Scola

[11] Patent Number: 4,742,152
[45] Date of Patent: May 3, 1988

[54] HIGH TEMPERATURE FLUORINATED POLYIMIDES

[75] Inventor: Daniel A. Scola, Glastonbury, Conn.

[73] Assignee: United Technologies Corporation, Hartford, Conn.

[21] Appl. No.: 867,720

[22] Filed: May 27, 1986

[51] Int. Cl.$^4$ .............................................. C08G 69/26
[52] U.S. Cl. ................................... 528/353; 528/352; 528/229; 528/188
[58] Field of Search ................ 528/353, 352, 229, 188

[56] References Cited

U.S. PATENT DOCUMENTS

| | | |
|---|---|---|
| 3,310,573 | 3/1967 | Coe . |
| 3,356,648 | 12/1967 | Rogers . |
| 3,705,870 | 12/1972 | Darmory et al. .................. 528/353 |
| 4,063,984 | 12/1977 | Critchley . |
| 4,307,024 | 12/1981 | Kray et al. . |
| 4,336,175 | 6/1982 | Gibbs . |
| 4,569,988 | 2/1986 | Scola et al. ......................... 528/353 |

FOREIGN PATENT DOCUMENTS 1062435 3/1967 United Kingdom .
1216505 12/1970 United Kingdom .

OTHER PUBLICATIONS

Paper titled "Synthesis of Multifunctional Triarylfluoreithanes, Condensation of Fluoro Ketones by William D. Kray and Robert W. Rosser; J. Org. Chem., vol. 42, No. 7, 1977, pp. 1186–1189.

Primary Examiner—John Kight
Assistant Examiner—M. L. Moore
Attorney, Agent, or Firm—A. Dean Olson

[57] ABSTRACT

High temperature fluorinated polyimides having repeating polymer units of the formula

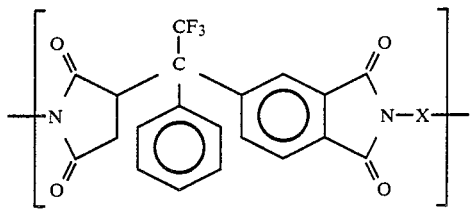

wherein X is aromatic or aliphatic. The polyimides can be made by oxidizing 1-phenyl-1,1-bis (3,4-xylyl)-2,2,2-trifluorethane to form 4,4'(2,2,2-trifluoro-1-phenylethylidene)biphthalic tetra carboxylic acid and dehydrating that to form 4,4'(2,2,2-trifluoro-1-phenyl-ethylidene-biphthalic tetra carboxylic acid dianhydride. The dianhydride is polymerized with a diamine to form a polyamic acid which is further imidized to the polyimide. Alternatively, the dianhydride can be esterified to form a 4,4'(2,2,2-trifluoro-1-phenylethylidene)-biphthalic tetracarboxylic acid dialkylester which is then polymerized with a diamine to form a polyamic acid which can then be imidized to a polyimide.

9 Claims, No Drawings

HIGH TEMPERATURE FLUORINATED POLYIMIDES

CROSS REFERENCES

This application relates to commonly assigned co-pending applications Ser. Nos. 867,719 and 867,716 filed on even date herewith entitled "High Temperature Fluorinated Polymer" and "Monomers for High Temperature Fluorinated Polyimides" respectively, which disclose material related to that contained herein the disclosures of which are hereby incorporated by reference.

DESCRIPTION

1. Technical Field

The field of art to which this invention pertains is polymers and specifically high temperature fluorinated polyimides and methods of making the same.

2. Background Art

Composites are increasingly used as replacements for metal components in aerospace applications. Composites offer a variety of advantages over their metal counterparts such as lightweightness, improved strength, and the use of fewer components. Many of these components must be capable of withstanding elevated temperatures of about 200 degrees centigrade (° C.) to about 400° C. (e.g. when they are in close proximity to gas turbine engines). A few high temperature polymers exist, such as PMR-15 TM polyimide NASA Lewis, licensed to various companies (Ferro Corporation, U.S. Polymeric, etc.; Culver City, Calif. and Santa Ana, Calif.) HR600 TM polyimide (National Starch, Bridgewater, N.J.) and NR150B2 polyimide (E.I. DuPont de Nemours, Wilmington, Del.) However, high temperatures and pressures can be required to process these resins into composites or resin parts. At these high temperatures, for example, the pressure bags that are used in composite autoclave processing can fail.

Accordingly, there has been a constant search in this field of art for high temperature resins that can be processed at lower temperatures and pressures.

DISCLOSURE OF INVENTION

The disclosure of this invention is directed to high temperature fluorinated polyimides that can be processed at lower temperatures and pressures.

The polyimide has repeating polymer units of the formula

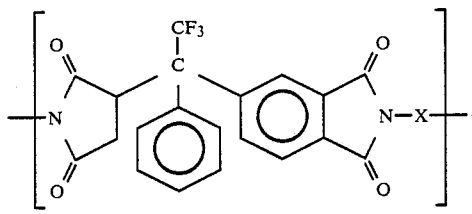

wherein X is aromatic or aliphatic.

Another aspect of this invention is a method of making a high temperature fluorinated polyimide. 1-phenyl-1,1-bis(3,4-xylyl)-2,2,2-trifluorethane is oxidized to form the corresponding tetra-acid which is then dehydrated to form 4,4'(2,2,2-trifluoro-1-phenyl-ethylidene-biphthalic tetra scarboxylic acid dianhydride. The dianhydride is polymerized with a diamine to form a polyamic acid and the polyamic acid is imidized to form a polyimide.

Yet another aspect of this invention is another method of making a high temperature fluorinated polyimide.

1-phenyl-1,1-bis(3,4-xylyl)-2,2,2-trifluoroethane is oxidized to form the corresponding tetra-acid which is subsequently dehydrated to form 4,4'(2,2,2-trifluoro-1-phenylethylidene) biphthalic tetra carboxylic acid dianhydride. The dianhydride is esterified to form a dialkylester which is polymerized with a diamine to form a polyamic acid. The polyamic acid is imidized to the polyimide.

These polymers provide excellent properties when processed at low temperatures and pressures. Thus, they make a significant advance in the field of high temperature polymers.

The foregoing and other objects, features and advantages will be apparent from the specification, claims and from the accompanying drawings which will illustrate an embodiment of the invention.

BEST MODE FOR CARRYING OUT THE INVENTION

Xylene available from J. T. Baker Company, (Phillipsburg, N.J.) and trifluoroacetophenone available from: Aldrich Chemical Company (Milwaukee, Wis.) react in the presence of a strong Friedel-Crafts acid catalyst such as trifluoromethyl sulfonic acid available from Aldrich Chemical Company (Milwaukee, Wis.) resulting in the monomer intermediates of these fluorinated polyimides. The reaction product is 1-phenyl-1,1-bis(3,4-xylyl)-2,2,2-trifluoroethane depicted empirically below and hereinafter referred to as 3F-tetramethyl.

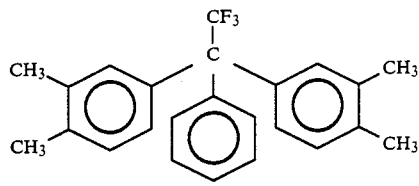

3F-tetramethyl is oxidized in the presence of a strong oxidizing agent such as manganate, chromic acid or nitric acid available from J. T. Baker Chemical Company (Phillipsburg, N.J.) to form the corresponding tetra acid; 4,4'(2,2,2-trifluoro-1-phenylethylidene)-biphthalic tetracarboxylic acid, also called 1,1,1-trifluoro-2-phenyl-2-bis(4,4'-phthalic acid) ethane, which is depicted empirically below and hereinafter referred to as 3F-tetra acid.

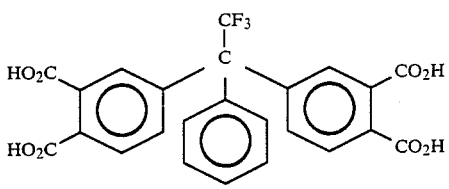

3F-tetra acid is dehydrated preferably with heat or alternatively with an anhydride such as an aliphatic anhydride preferably acetic, propionic or butanoic anhydride. Acetic anhydride is available from J. T. Baker Chemical Company (Phillipsburg, N.J.). The dehydration results in the dianhydride; 4,4'(2,2,2-trifluoro-1- phenylethylidene)-biphthalic tetra carboxylic acid dianhydride which is depicted empirically below and hereinafter referred to as 3F-dianhydride.

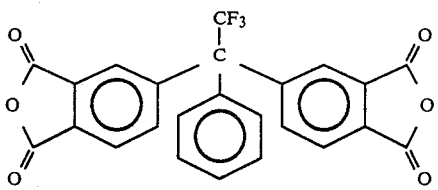

Preferably, the 3F dianhydride is reacted with diamines resulting in the immediate formation of polyamic acid poly(arylene or alkylene 4,4'-(2,2,2-trifluoro-phenylethylidene bipthalamic acid) which is depicted empirically below. The reaction is preferably carried out in an aprotic solvent and it is especially preferred that it is carried out in dimethyl formamide, dimethylacetamide, diglyme, dioxane, N-methylpyrrolidine, dimethylsulfoxide because this results in higher molecular weight polymers which exhibit better properties (e.g. strength). The above process is preferred to the alternative intermediate esterification of the dianhydride described below since that process entails an extra step with no offsetting advantages.

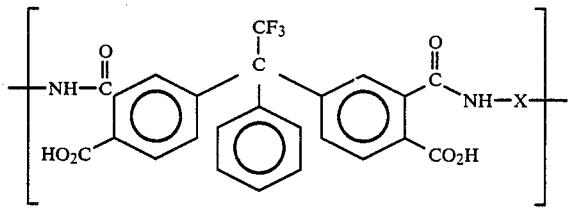

There are a variety of aromatic and aliphatic diamines that can be used in the practice of this invention. According to the formula $NH_2—X—NH_2$, it is preferred that X is para or ortho linked phenylene or biphenylene because of thermal stability provided by these groups. The para position is preferred to the ortho position because there is no steric hindrance, while for the ortho isomer there is considerable steric hindrance. This steric hindrance for the polymer with ortho substitution causes reduced thermal stability. These phenylene groups can be additionally substituted with halogen, aryl, alkyl, nitro, sulfonic acid, carboxylic acid, hydroxy, cyano, aryloxy and alkoxy groups. When X is ortho, meta or para linked phenylene, it is preferred that the substituents are ortho or meta to the phenylene linkage. When X is ortho, meta or para linked biphenylene, the substituents can be ortho, meta or para to the biphenylene linkages.

The diamines can also have the formula

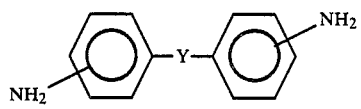

where Y is methylene ($CH_2$), sulfone ($SO_2$), sulfoxide (SO), carbonyl (CO), oxide (O), sulfide (S), aromatic and/or aryloxy groups. Of these functionalities methylene and oxide are preferred because of ease of processability and excellent thermal stability. However, the sulfone group is preferred if the highest thermal stability is desired. It is not preferred that Y is an alkylene group because the resulting polyimides may not have the high temperature properties typically desired.

The diamines can also comprise any of a number of fused aromatic rings such as naphthalene, anthracene, phenanthrene, indene, pyrene, triphenylene, and substituted fused aromatic ring systems. These fused aromatic diamines may also be substituted in the ortho meta or para positions. The diamines may also comprise a number of heteroaromatic ring systems such as quinoline, pyridine, acridine, thiophene and indole. These may also be substituted within varying positions within the molecule.

Typically, the naphthalene aromatic fused ring diamine systems can have the diamine in the positions

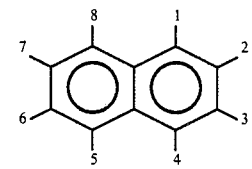

(1,2), (1,3), (1,4), (1,5), (1,6), (1,7), (1,8), (2,3), (2,4), (2,5), (2,6), (2,7), (2,8) with the (1,4), (1,5), (1,7), (2,6) and (2,8) with the (1,4), (1,5), (1,7), (2,6) and (2,8) positions favored because of the greater thermal stability of the resultant polymers. It is also preferred that the fused aromatic ring is naphthalene because of its stability. Typically, the anthracene diamine can have the diamine linkage in the positions

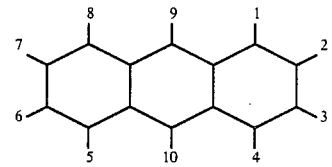

(1,2), (1,3), (1,4), (1,10), (1,5), (1,6), (1,7), (1,8), (1,9), (2,3), (2,4), (2,5), (2,6), (2,7), (2,8), (2,9) with positions (1,7), (1,4) and (2,6) and (2,9) favored because of the greater stability of the resultant polymers. The above described diamines are not meant to be an exhaustive list of those diamines that can be advantageously utilized in the practice of this invention and those skilled in the art will know other diamines that may be used in this invention.

An alternative approach to the direct polymerization of the 3F-dianhydride described above is the esterification of the 3F-dianhydride with an alcohol, preferably a short chain alcohol, such as ethanol available from J. T. Baker Company (Phillipsburg, N.J.) to produce the dialkylester; 4,4'(2,2,2-trifluoro-1-phenylethylidene)-bipthalic tetracarboxylic acid dialkylester, hereinafter referred to as 3F-dialkyester depicted empirically below.

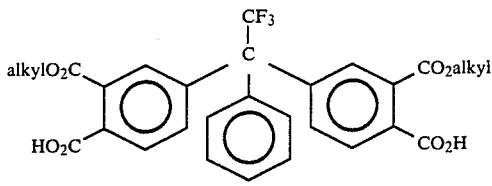

The above diaklylester is reacted with an alcohol solution of the above described diamines to form the polyamic acid poly(arylene or alkylene 4,4'-2,2,2-trifluoro-phenylethylidene bipthalamic acid) described above.

These polyimides can be used as composite resins in conjuction with a variety of fibers such as graphite, carbon, polymeric fibers, boron, silicon carbide, glass, ceramic and a variety of fillers such as silica, mica, diatomaceous earth, carbon black, polymeric fillers. It is preferred that the fibers are graphite or glass because of the high modules. An exemplary material is Celion TM 6000 fiber available from (BASF, Parsippany, N.J.). Another is HMS TM fiber available from Hercules (Wilmington, Del.).

The mole ratio of diamine to dianhydride (or in the alternative process dialkyl ester) effects the molecular weight of the polyamic acid and resultant polyimide as well as the properties of the resultant polyimide, composite, etc. As the mole ratio of dianhydride to diamine increases, the molecular weight of the polyamic acid and resultant polyimide increases. The molecular weights as calculated are very sensitive to the mole ratio as is shown in Table I. It is believed the excess dianhydride behaves as an end-cap, thereby controlling the molecular weight. In addition, as the mole ratio of dialkylester to diamine increases, the molecular weight increases. Again, the molecular weight is very sensitive to the ratio as is illustrated in Table I. The polyamic acid form of the polymer is preferred for impregnation of fibers and fillers because of its solubility and therefore it can be more easily processed than the polyimide form.

TABLE I

| Dianhydride/Diamine Mole Ratio | Molecular Weight | Dialkylester Amine Mole Ratio | Molecular Weight |
|---|---|---|---|
| 1.0498 | 10,000 | 1.0498 | 10,000 |
| 1.0255 | 20,000 | 1.0255 | 20,000 |
| 1.0172 | 30,000 | 1.0172 | 30,000 |
| 1.0129 | 40,000 | 1.0129 | 40,000 |
| 1.01037 | 50,000 | 1.01037 | 50,000 |
| 1.0052 | 100,000 | 1.0052 | 100,000 |

For applications to fabricate impregnated glass or graphite tapes used in composite fabrication, the preferred ratios of anhydride to diamine are about 1.05 to about 1.026. This gives higher solubility of the polyamic acid precursor in typical solvents (e.g. diglyme) for impregnation of the fibrous materials. For applications in film forming, the preferred ratios of dianhydride to diamine are about 1.05 to about 1.017 yielding a polyamic acid of higher molecular weight, which can be converted to high molecular weight polyimide film. For adhesive applications, the preferred mole ratios of dianhydride to diamine are about 1.025 to about 1.013, yielding soluble polyamic acid precursor which can be formlated into film adhesive composition for adhesive bonding.

Since the dialkylester leads to the polyamic acid precursor of similar solubility characteristics, as derived from the dianhydride, the preferred ranges of diester to diamine are similar to those used with dianhydride/amine for the particular application.

The high temperature fluorinated polyimides of this disclosure may be made using the above-described compounds and the following procedures. It is preferable to dissolve trifluoroacetophenone in a molar excess preferably about 10 to 1 of xylene at about 20° C. to about 25° C. (room temperature) under slight agitation for about 2-4 days. The molar excess is preferred because it increases the product yield. In contrast to the following autoclave method this method is preferable because yields are considerably higher and it is carried out under ambient conditions. The 3F-tetramethyl compound precipitates out is easily filtered and washed with an alcohol solution yielding a clean white solid. Alternatively, the xylene and trifluoroacetophenone can be mixed in an autoclave under ambient pressures for about 3 to about 5 hours at a temperature of about 125° C. to about 175° C. in the presence of about 4 to about 12 weight percent (%) trifluoromethyl sulfonic acid yielding the 3F-tetramethyl compound. This reaction is depicted empirically below.

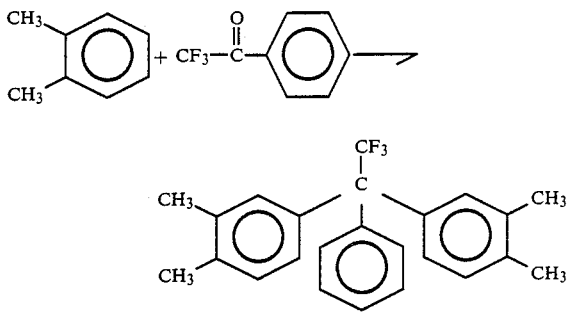

About 25% to about 35% nitric acid (about 3.0 moles nitric acid per mole of methyl group to about 3.6 moles nitric acid per methyl group) is added to the 3F tetramethyl compound and the resulting slurry is heated at about 150° C. to about 250° C. for about 0.5 to about 1.5 hours in an autoclave under ambient pressure. Beyond about 1.5 hours a high percentage of undesirable side products such as nitration products result. After heating the reaction is cooled rapidly resulting in the 3F-tetra acid. This reaction is depicted empirically below.

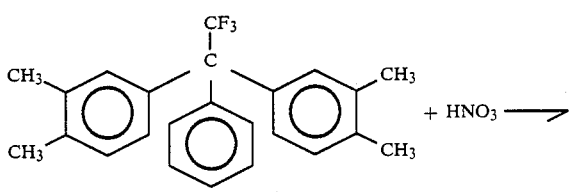

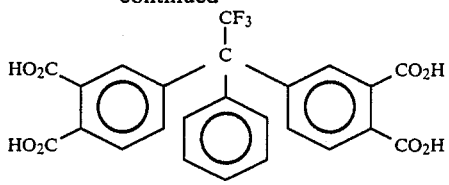

It is preferable to treat the 3F-tetra acid at about 180° C. to about 240° C. for about 1 to about 3 hours under about 1 mm to about 30 mm vacuum because this results in a high yield of pure product. Under these conditions, water is removed and the 3F-dianhydride is formed. Alternatively, the 3F-tetra acid is dissolved in about 5 to about 15 molar excess of acetic anhydride and refluxed for about 0.5 to about 2 hours. It is subsequently cooled to about below 0° C. to about 25° C. (room temperature) to precipitate a white crystalline solid (3F-dianhydride) which is filtered and air-dried. This reaction is depicted empirically below.

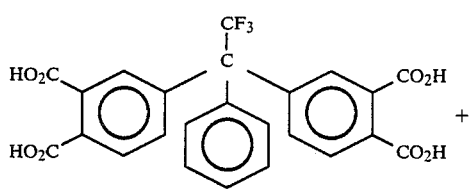

Alkyl Anhydride ⟶

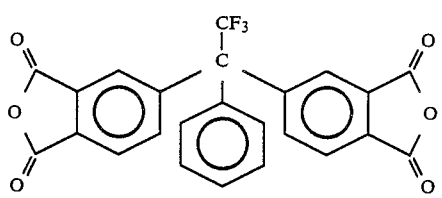

3F-dianhydride reacts with aprotic solvent solutions of the above-described diamines at temperatures of about 20° C. to about 60° C. at atmospheric pressures for about 1 to about 24 hours in an inert atmosphere to yield the 3F-polyamic acid. Above about 60° C., undesirable imide formation occurs. This reaction is depicted empirically below.

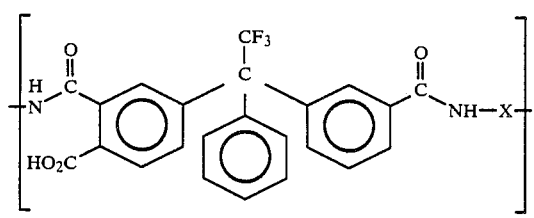

Diamine ⟶

Alternatively, the dianhydride described above can be transformed into the polyamic acid by going through an intermediate esterification reaction. The 3F-dianhydride is preferably dissolved in about 5 to about 10 molar excess of alcohol and refluxed for about 2 to about 4 hours at which time the excess alcohol is evaporated under 30 mm to about 1 mm vacuum at a temperature below about 40° C. Above about 40° C., the reverse reaction to dianhydride can occur. The below reaction and resultant clear amber solid 3F-dialkylester are depicted empirically below.

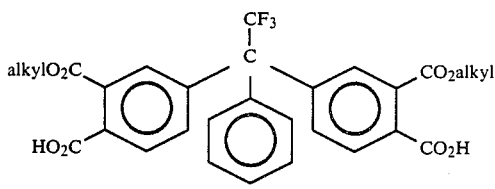

Alcohol ⟶

Equal molar mounts of dialkylester and an alcohol solution or aprotic solution of diamine are mixed and the alcohol or solvent is evaporated off at room temperatures over a period of about ½ hour to about 2 hours yielding 3F-polyamic acid. This reaction is depicted empirically below.

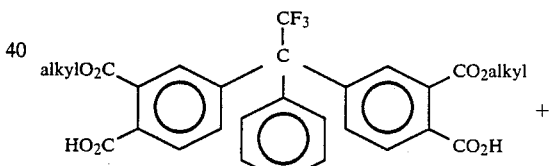

$H_2N-X-NH_2$ ⟶

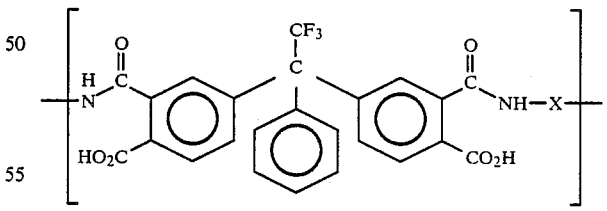

The resultant polyamic acid solution can be processed to the polyimide by a variety of paths. It can be used to impregnate a fiber bundle to yield polyamic acid film with traces of solvent. The polyamic acid solution can be heated to form a polyamic acid film. For example, the polyamic acid solution or film is then heated for about 1 hour to about 4 hours at temperatures of about 100° C. to about 300° C. utilizing optional pressure resulting in the polyimide. It is preferred to post-cure the polymer at temperatures of about 300° C. to about 350° C. for about 2 hours to about 24 hours under optional pressure of about 100 psi to about 2000 psi to achieve the maximum high temperature polymer properties.

Alternatively, the polyamic acid solid derived from solution by precipitation with water is processed at about 150° C. to about 300° C., preferably under pressures of about 200 to about 1000 psi. The polymer is processed (post-cured) at about 300° C. to about 350° C. for about 1 to about 24 hours to yield the polyimide of this disclosure. Alternatively, the polyamic acid solid can be added to ortho toluene or xylene and refluxed while removing water to produce the polyimide. The polyamic acid solution can also be used to impregnate tapes for composites which are then treated at elevated temperatures of about 200° C. to about 350° C. for about 3 hours to about 6 hours and optionally pressures of about 100 psi to about 2000 psi resulting in high temperature composites.

EXAMPLE I

Into a three neck round bottom flask equipped with stirrer reflux condenser and addition funnel was added 600 ml o-xylene, 50 g (0.287 mole) of trifluoroacetophenone and 25 g of trifluoromethane sulfonic acid. The reaction mixture was stirred for 72 hours at room temperature. The solution was washed with water to remove trifluoromethane sulfonic acid. A white solid precipitated from the washed organic layer, which after filtration, washing in cold ethanol, and drying, weighed 81.4 g (77% yield) mp 178.5°–180° C.

This 3F-tetramethyl compound was characterized by infrared and NMR spectroscopy, high pressure liquid chromatography for purity and elemental analyses.

Calculated $C_{24}H_{23}F_3$: C, 78.23; H,6.29; F,15.47.

Found: C, 78.12; H,6.28; F,15.47.

In a stainless steel autoclave 10 g (0.027 mole) of 3F-tetramethyl and 6.8 ml of 30% nitric acid were added. The autoclave was sealed and the reaction mixture was heated to 200° C. for 1 hour and then cooled immediately. The cooled mixture was removed from the reaction vessel. The excess acid was removed in a rotary evaporator to yield a pale yellow solid (14.2 g). The pale solid was dried at 80° C. in a vacuum to yield a pale yellow crystalline material 13.6 g (96% yield) mp 110°–114° C. (foamed). Elemental analyses showed it to be the dihydrate of the 3F-tetra-acid. Calculated $C_{24}H_{19}F_3O_{10}$: C,54.98; H,3.65; F,10.87. Found: C,54.70; H,3.46; F,10.84.

The monohydrate of the 3F-tetra-acid was obtained by treatment of the product isolated as described above at 60° C. for 1 hour.

Calculated $C_{24}H_{17}F_3O_9$: C,56.92; H,3.38; F,11.26.

Found: C,56.21; H,3.02; F,10.38.

The tetra-acid 8.20g (0.0168 mole) was heated at 190° C. for 1 hour to yield 7.729 g dianhydride, mp 120°–125° C. Elemental analyses gave the following results:

Calculated $C_{24}H_{11}F_3O_6$: C, 63.72; H,2.45; F, 12.60.

Found: C,62.2; H,2.48; F,12.51.

2.24 grams (g) (0.05 mole) 3F-dianhydride was dissolved in 12 cubic centimeters (cc) of absolute ethanol and refluxed for about 40 minutes to yield 2.70g (0.05 mole) 3F-diethylester. The 3F-diethylester-alcohol solution was added over a period of about 15 minutes at room temperature to a solution of p-phenylenediamine 0.54 grams (0.05 mole) in 10 cc absolute ethanol resulting in a 3F-polyamic acid solution. A portion of the solution was concentrated to a solid by heating at 40° C. to evaporate the alcohol. The resultant powder was processed into a polymer disc at 200° C., 1000 psi over a period of 1 hour. The polymer was further polymerized at 310° C. for 1 hour to obtain the polymer yielding the glass transition temperature detailed in Table I.

A second portion of the above 3F-polyamic solution was used to impregnate a Celion 6000 graphite fiber tow at room temperature. The solvent was allowed to evaporate and the tape was assembled into layers to form a laminate structure. The prepolymer impregnated graphite fiber was heated to 200° C. under 200 psi pressure to form a polyimide composite. Further consolidation and polymerization of the graphite polymer material was carried out by raising the temperature to 325° C. under 1000 psi pressure. It was held at these conditions for 1 hour yielding the composite properties detailed in Table II.

EXAMPLE II

In a flask equipped with a reflux condenser, and stirrer was added 77.5 g (0.017 mole) of 3F-dianhydride (made by the above process) and 200 ml of diglyme. To this solution was added 4.14 g (0.0167 mole) of 4,4'-diaminodiphenylsulfone in an atmosphere of nitrogen. The solution was allowed to reflux for 12 hours during which time the polymer precipitated from solution (7.9 g). The precipitated polymer was further cured at 312° C. for 12 hours to yield a solid with a glass transition temperature of 360° C. TGA showed a weight loss of 1–2% up to 500° C.

EXAMPLE III

A flask containing 7.752 g (0.017 mole) of 3F-dianhydride, 200 ml of diglyme and 3.3 g (0.01670 mole) of 4,4'-methylene dianiline was refluxed for 12 hours, during which time a polymer precipitated out of solution (8.4 g). The preciptated polymer was further polymerized in the solid state at 316° C. for 12 hours, yielding a polymer with a glass transition temperature of 360° C.

EXAMPLE IV

In a flask equipped with a reflux condenser, and stirrer was added 7.75 (0.0171 mole) of 3F-dianhydride and 200 ml diglyme. To this solution was added 5.68 g (0.0167 mole) of 3,3'bis(p-aminophenyl) hexafluoroisopropylidene in an atmosphere of nitrogen. The solution was refluxed under an atmosphere of nitrogen for 10 hours during which time a polymer precipitated. The filtered polymer 10.2 g was further polymerized at 316° C. for 12 hours yielding a glass transition temperature of 340° C.

EXAMPLE V

In a flask equipped with a reflux condenser and stirrer was added 7.61 g (0.017 mole) of 3F-dianhydride and 200 ml of diglyme. To this solution was 8.65 g (0.0167 mole) of 4,4'-bis p-aminophenoxyphenyl)-hexafluoroisopropylidene (BDAF) in an atmosphere of nitrogen. The solution was refluxed for 12 hours in an atmosphere of nitrogen, during which time a polymer precipitated. The filtered polymer weighed 13.1 g. The polymer was further treated at 312° C. for 12 hours yielding a material with a glass transition temperature of 340° C.

The polyimide of this disclosure has comparable properties to other high temperature polymers such as Dupont NR-150B2 as the data in Table II below on polymer and composite properties illustrates.

TABLE II

| Properties of Polymer | 3F Polyimide | DuPont NR-150B2 |
|---|---|---|
| Glass transition temperature | 350° C. | 340° C. |

| Properties of Celion 6000/3F Polyimide Composite | | |
|---|---|---|
| | RT | |
| | Flexural Strength ksi | Flexural Modulus $10^6$ psi |
| Celion 6000/3F Polyimide | 125 | 19.8 |
| DuPont HMS/NR-150B2 | 126 | 21.0 |

| | Shear Strength, ksi | | |
|---|---|---|---|
| | RT | 600° F. (316° C.) | 662° F. (350° C.) |
| Celion 6000/ 3F Polimide | 8.55 | 3.5 | 4.4 |
| DuPont HMS/ NR-150B2 | 7.40 | 4.6 | 4.6 (343° C.) |

In contrast with other high temperature polymers these polyimides have superior high temperature properties when processed at lower temperatures and pressures. It is believed that the lower temperature processing is due to the bulky phenyl group attached to the carbon bearing the trifluoromethyl groups. This decreases interchain attraction and therefore the temperature and pressure at which flow occurs is lower than other high temperture polymers. Yet, properties at high temperature are not compromised. Evidence of this is that the above composite properties were comparable to the DuPont HMS/NR-150B2 composite even through that system is processed at 427° C. (800° F.) 2500 psi in contrast to the 325° C., 1000 psi processing conditions of the 3F polyimides. These lower processing conditions save energy and alleviate degradation of fibers, etc.

These polymers make a significant advance in the field of high temperature polymers. Either as solid polymers, fibers, films or when incorporated into composites they provide the strength properties at high temperatures desired for aerospace applications. Their excellent properties (e.g. Tg, fracture toughness, tensile strength, strain-to-failure) at high temperatures when processed at low temperatures and pressures give them a distinct advantage in this field of art. This advantage and the fact that they are processed from readily available cheap starting materials resulting in high yielding reactions facilitates their use in aerospace applications.

It should be understood that the invention is not limited to the particular embodiment shown and described herein, but that various changes and modifications may be made without departing from the spirit or scope of this concept as defined by the following claims.

I claim:

1. A high temperature fluorinated polyimide having repeating polymer units of the formula

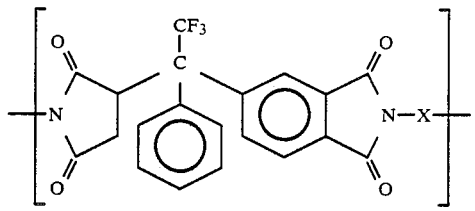

wherein X is aromatic or aliphatic.

2. The high temperature fluorinated polyimide as recited in claim 1 wherein X represents:
   a. ortho, meta, or para phenylene or biphenylene optionally substituted with halogen, aryl, alkyl, nitro, sulfonic acid, carboxylic acid, hydroxy, cyano, aryloxy, or alkoxy; or
   b.

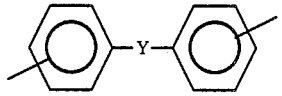

where Y is methylene, sulfone, sulfoxide, carbonyl, oxide, sulfide, aromatic or aryloxy; or
   c. naphthalene, anthracene, phenanthrene, triphenylene or pyrene; or
   d. pyridine, quinoline, acridine, thiophene or indole.

3. The polyimide as recited in claim 1 where in X is para-phenylene, 4,4 sulfonyl bis phenylene, 4,4'-methylene bis phenylene, 3,3' hexafluoroisopropylidene bis (phenylene) or 4,4' hexafluoroisopropylidene bis phenoxy phenylene.

4. A method of making a high temperature fluorinated polyimide comprising:
   a. oxidizing 1-phenyl-1, 1-bis(3,4-xylyl)-2,2,2-trifluorethane to form a tetra acid, 4,4'(2,2,2-trifluoro-1-phenylethylidene) biphthalic tetracarboxylic acid;
   b. dehydrating said tetra acid to form a dianhydride of 4,4'(2,2,2-trifluoro-1-phenylethylidene) biphthalic tetracarboxylic acid;
   c. esterifying said dianhydride to form a diester 4,4'(2,2,2-trifluoro-1-phenylethylidene)-biphthalic tetracarboxylic acid dialkylester;
   d. polymerizing said diester with a diamine to form a polyamic acid; and
   e. imidizing said polyamic acid to form a polyimide.

5. The method of making a high temperature fluorinated polyimide as recited in claim 4 wherein said diamine is para-phenylene, 4,4 sulfonylbis (phenylene) 4,4'-methylenebis (phenylene) or 3,3'hexafluoroisopropylidenebis (phenylene) or 4,4' hexafluoroisopropylidenebis (phenoxy phenylene).

6. The method of making a high temperature fluorinated polyimide as recited in claim 4 wherein said 1-phenyl-1,1-bis(3,4-xylyl)-2,2,2-trifluorethane is oxidized at a temperature below about 250° C. for less than about 1.5 hours with nitric acid.

7. The method of making a high temperature fluorinated polyimide as recited in claim 4 wherein said tetra acid is dehydrated at about 180° C. to about 240° C. for about 1 hour to about 3 hours under about 1 millimeter to about 30 millimeters of vacuum.

8. The mthod of making a high temperature fluorinated polyimide as recited in claim 4 wherein said dianhydride is esterified at a temperature below about 40° C.

9. The method of making a high temperature fluorinated polyimide as recited in claim 4 wherein said polyimide is heated at a temperature less than about 320° C. resulting in a high temperature polyimide.

* * * * *

UNITED STATES PATENT OFFICE
CERTIFICATE OF CORRECTION

PATENT NO. : 4,742,152
DATED : May 3, 1988
INVENTOR(S) : Daniel A. Scola

It is certified that error appears in the above-identified patent and that said Letters Patent is hereby corrected as shown below:

IN THE ABSTRACT, replace the formula as follows:

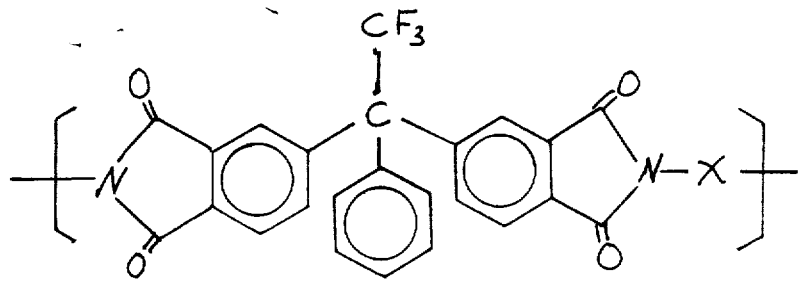

Col. 1, lines 50-60, replace the formula as follows:

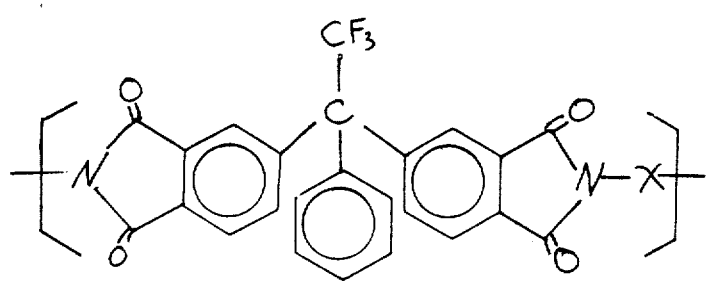

UNITED STATES PATENT AND TRADEMARK OFFICE
CERTIFICATE OF CORRECTION

PATENT NO. : 4,742,152

DATED : May 3, 1988

INVENTOR(S) : Daniel A. Scola

It is certified that error appears in the above-identified patent and that said Letters Patent is hereby corrected as shown below:

Col. 12, lines 1-10, replace the formula as follows:

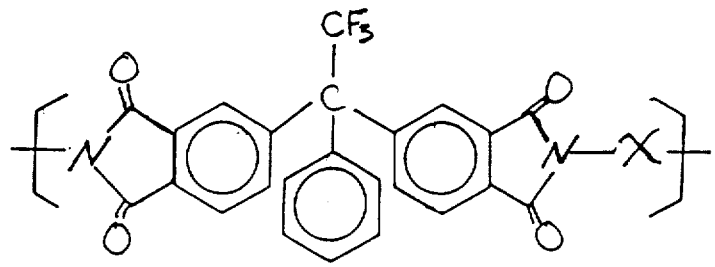

Signed and Sealed this

Twentieth Day of March, 1990

*Attest:*

JEFFREY M. SAMUELS

*Attesting Officer*      *Acting Commissioner of Patents and Trademarks*